United States Patent
Girkar et al.

(10) Patent No.: US 7,996,363 B2
(45) Date of Patent: Aug. 9, 2011

(54) REAL-TIME APPLY MECHANISM IN STANDBY DATABASE ENVIRONMENTS

(75) Inventors: Mahesh Girkar, Cupertino, CA (US); Benedicto Garin, Hudson, NH (US); Joydip Kundu, Derry, NH (US)

(73) Assignee: Oracle International Corporation, Redwood Shores, CA (US)

( * ) Notice: Subject to any disclaimer, the term of this patent is extended or adjusted under 35 U.S.C. 154(b) by 849 days.

(21) Appl. No.: 10/927,927

(22) Filed: Aug. 27, 2004

(65) Prior Publication Data

US 2005/0262170 A1 Nov. 24, 2005

Related U.S. Application Data

(60) Provisional application No. 60/572,858, filed on May 19, 2004.

(51) Int. Cl.
*G06F 17/00* (2006.01)
(52) U.S. Cl. .................. 707/638; 707/640
(58) Field of Classification Search .............. 707/638
See application file for complete search history.

(56) References Cited

U.S. PATENT DOCUMENTS

| | | | |
|---|---|---|---|
| 6,691,139 B2 * | 2/2004 | Ganesh et al. | 707/204 |
| 6,820,098 B1 * | 11/2004 | Ganesh et al. | 707/202 |
| 7,003,694 B1 * | 2/2006 | Anderson et al. | 714/16 |
| 7,549,079 B2 * | 6/2009 | Connolly et al. | 714/5 |
| 2004/0098425 A1 * | 5/2004 | Wiss et al. | 707/204 |
| 2005/0289197 A1 * | 12/2005 | Kan et al. | 707/204 |
| 2006/0179347 A1 * | 8/2006 | Anderson et al. | 714/16 |

OTHER PUBLICATIONS

Oracle® Corporation, "1 Introduction to the Oracle Database",Oracle Database Concepts 10g Release 1(10.1) Part No. B10743-01, 1993, pp. 1-44.
Oracle® Corporation, "Contents", Oracle Data Guard Concepts and Administration 10g Release 1(10.1) Part No. B10743-01,1999, pp. 1-8.
Oracle® Corporation, "Oracle8i Standby Database Concepts and Administration Release 2(8.1.6)", Oracle8i Standby Database Concepts and Administration—Contents, 1996, pp. 1-4.
Oracle® Corporation, "Oracle Backup and Recovery", Oracle Database 10g, 2004, pp. 1-4.
Oracle® Corporation, "17 High Availability", Oracle Database Concepts 10g Release 1(10.1) Part No. B10743-01, 1993, pp. 1-10.

* cited by examiner

*Primary Examiner* — Charles Rones
*Assistant Examiner* — Mellissa M Chojnacki
(74) *Attorney, Agent, or Firm* — Hickman Palermo Truong & Becker LLP

(57) ABSTRACT

A method and apparatus for applying changes to a standby database in real-time. According to one aspect, a change is applied to data contained in a standby database. The standby database functions as a replica of a primary database. The primary database has a current online redo log file to which a particular redo block was written. According to one aspect, prior to the archiving of the current online redo log file, the particular redo block is received at a process associated with the standby database. A change indicated by the particular redo block is applied to the data contained in the standby database.

8 Claims, 3 Drawing Sheets

REAL-TIME APPLY MECHANISM IN STANDBY DATABASE ENVIRONMENTS

CROSS-REFERENCE TO RELATED APPLICATIONS

This application claims domestic priority to provisional U.S. patent application Ser. No. 60/572,858, entitled REAL TIME APPLY MECHANISM IN STANDBY DATABASE ENVIRONMENTS, filed May 19, 2004; the contents of which are hereby incorporated by reference in their entirety for all purposes.

FIELD OF THE INVENTION

The present invention relates to databases, and in particular, to a mechanism that applies, to a standby database, in real-time, changes made to a primary database for which the standby database functions as a replica.

BACKGROUND

In typical database systems, users store, update and retrieve information by submitting commands to a database application. To be correctly processed, the commands must comply with the database language that is supported by the database application. One popular database language is known as Structured Query Language (SQL).

A logical unit of work that is comprised of one or more database language statements is referred to as a transaction. In a database server, a memory area called the System Global Area (SGA) is allocated and one or more processes are started to execute one or more transactions. The combination of the SGA and the processes executing transactions is called a database server.

Some database systems provide a buffer cache that is shared among the processes that are executing transactions in a database. The buffer cache resides in a portion of the SGA and holds database information. Buffers in the buffer cache hold copies of data blocks that have been read from the data files of the database. User processes concurrently connected to a database server instance share the buffers. When a transaction desires to make a change to a data block, a copy of the data block is loaded into a buffer of the buffer cache and the change is made to the copy of the data block stored in the database buffer cache in dynamic memory. At some time subsequent to when a transaction makes a change data in the buffer cache, one of the database processes, referred to herein as the "database writer," writes the modified blocks of data from the database buffer cache to the data files on disk.

A major aspect of database operation and administration involves the recovery of the database from the various types of failures encountered. One approach to safeguard a database against possible failures involves maintaining logs of operations. According to the logging approach, several different operation logs are maintained to perform various database maintenance functions. Specifically, a redo log is used to store database operations so that the operations can be re-performed to restore the database to its pre-failure state after a failure. For example, when a transaction modifies data in the data cache, a redo entry that specifies the modification is stored in a redo log on disk. If a failure occurs before the updated data within the buffer cache has been stored to disk, the modified data in the buffer cache may be lost. Under these conditions, the database may be modified based on the redo entry during the recovery process.

The basic component of a log system is a log file stored on disk. Redo log files are filled with redo entries that store low-level representations of database changes. Redo entries contain the information necessary to reconstruct, or redo, changes made by data operations such as INSERT, UPDATE, DELETE, CREATE, ALTER, or DROP. Redo entries are generated for each change made to a copy of a data block stored in the database buffer cache. In one implementation, a redo log buffer is a circular buffer that holds information about update operations recently performed by transactions. The redo log buffer is written to an online redo log file group on disk by a background process. The records in the online redo log file group on disk are referred to as redo logs.

According to one approach, multiple redo log files exist simultaneously, but only one of them is current. Each online redo log file is associated with a specified maximum size. As redo blocks are written to the current online redo log file, the current size of the current online redo log file increases. When the current size reaches the maximum size, the current online redo log file is archived. When the current online redo log file is archived, a copy of the current online redo log file is stored to a designated location, and another online redo log file becomes the current online redo log file.

After an online redo log-file has been archived, new redo blocks are not written to the archived copy of the redo log file. However, at a later time, the online redo log file (not the archived copy) may, once again, become the current online redo log file, and may be reused then. When the online redo log once again becomes the current online redo log file, old redo logs entries in the online redo log file may be overwritten by new redo blocks.

Replication is one technique used to maintain the availability of database systems. Replication is the process of replicating data from a "primary" database onto another database, herein referred to as a "standby" database. According to one approach, when a redo log file is archived, a copy of the archived redo log file is sent to a recovery process that executes in association with the standby database, herein referred to as the standby recovery process. The standby recovery process receives the archived redo log file and replicates, on the standby database, the changes indicated in the archived redo log file. If the primary database becomes unavailable, the standby database can be made primary.

One approach to replication is the "physical standby" approach. Under this approach, the changes made to data blocks on the primary database are made to replicas of those data blocks on a physical standby database. Because the primary database system is replicated at the lowest atomic level of storage space on the standby database, the physical standby database is a physical replica of the primary database.

Another approach to replicating data is the "logical standby" approach. Under the logical standby approach, database commands that modify data on the primary database are re-executed on a logical standby database. While executing the same database commands guarantees that changes are replicated at the record level, the changes are not replicated at the data block level. This change in replication strategy allows a logical standby database to be available to reporting applications while replication is being performed.

As discussed above, according to one approach, a standby recovery process replicates, on the standby database, changes indicated in an archived redo log file. Consequently, the standby recovery process does not replicate, on the standby database, changes made in the primary database until the redo log file that contains the changes is archived. As discussed above, a current online redo log file typically is not archived, and the resulting archived redo log file typically is not sent to the standby recovery process, until the current online redo log file's maximum size has been reached.

Consequently, at some moments in time, the data contained in a standby database might not be an accurate replica of the data contained in a primary database. If a query to the standby database was allowed at such times, then the results returned by the query might differ from results that would have been returned if the primary database were queried. Additionally, in the event that the primary database failed, then, before the standby database could be made primary, the standby recovery process might need to "catch up" with the changes not yet made to the standby database—changes indicated by redo entries in the not-yet-archived current online redo log file. This could cause a delay between the time that a primary database failed and the time that a standby database was made primary. Consequently, this could equate to a significant gap in data availability.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus are described for applying, to a standby database, in real-time, changes made to a primary database. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to one embodiment of the invention, in order to avoid momentary inconsistencies between data stored in a primary database and data stored in a standby database that functions as a replica of the primary database, redo blocks written to a current online redo log file of the primary database are sent toga standby recovery process prior to the archiving of the current online redo log file. For example, whenever a redo block is written to the current online redo log file, that redo block may be transmitted to the standby recovery process without waiting for the current online redo log file to be archived in response to the current online redo log file reaching a specified maximum size. The standby recovery process receives such redo blocks and applies, to the data contained in the standby database, changes indicated by the redo blocks.

As a result, the time during which the data contained in the standby database is inconsistent with the data contained in the primary database is reduced; the standby database is more tightly synchronized with the primary database. Thus, changes made to the data contained in the primary database are made to the data contained in the standby database in "real time."

Real-Time Standby Database System

Figure 1:
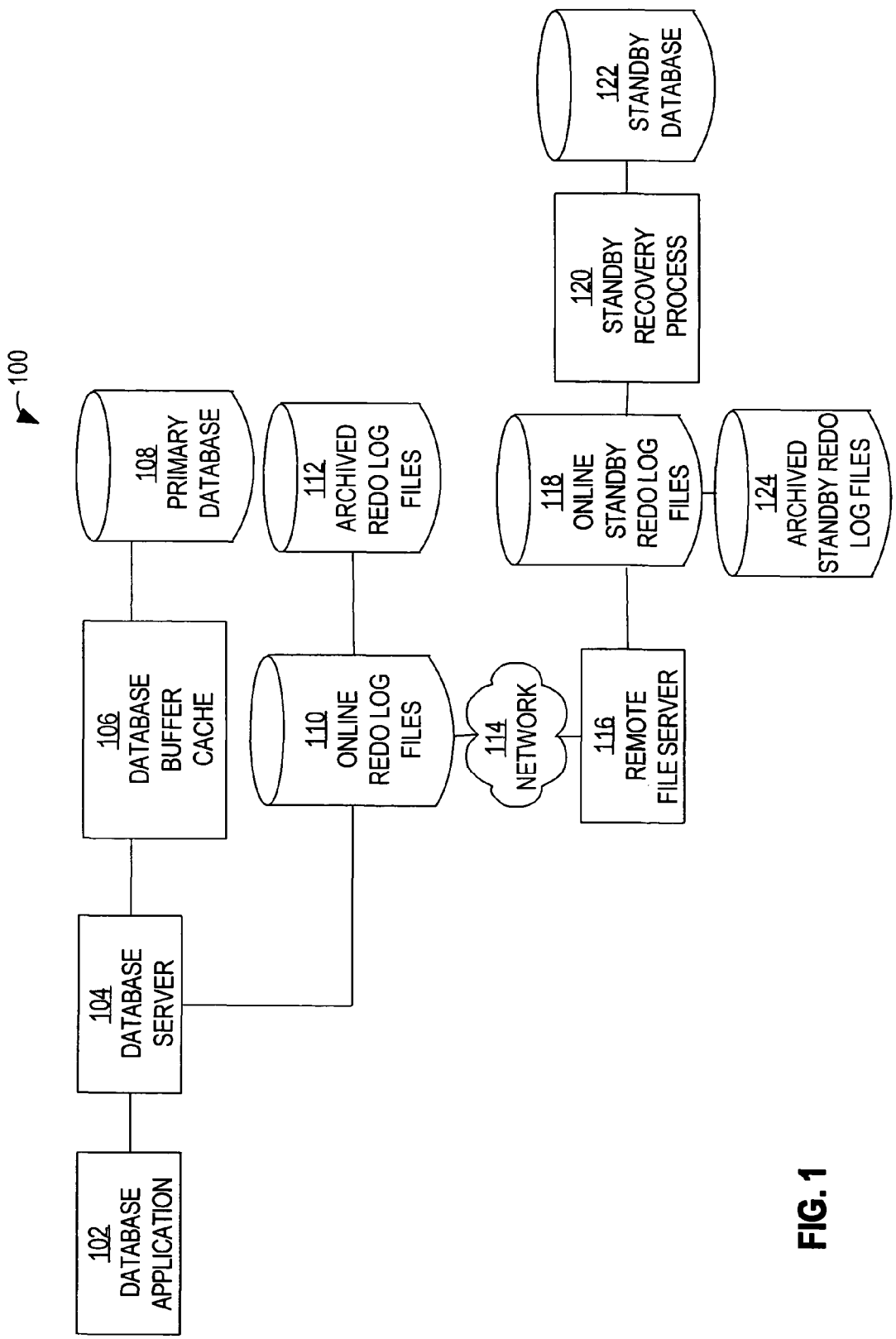
FIG. 1 is a block diagram that illustrates a system in which changes made to data contained in a primary database are applied, in real-time, to a standby database, according to an embodiment of the present invention.

FIG. 1 is a block diagram that illustrates a system 100 in which changes made to data contained in a primary database are applied, in real-time, to a standby database, according to an embodiment of the present invention. System 100 comprises a database application 102, a database server 104, a database buffer cache 106, a primary database 108, online redo log files 110, archived redo log files 112, a network 114, a remote file server 116, online standby redo log files 118, a standby recovery process 120, standby database 122, and archived standby redo log files 124. Standby database 122 may be located at a location that is remote relative to primary database 108. Network 114 may be, for example, a local area network (LAN), or a wide-area network (WAN) such as the Internet.

Database application 102 sends database commands to database server 104. Database server 104 receives the database commands from database application 102 and attempts to obtain, from database buffer cache 106, data that is relevant to the database commands. If the relevant data is not contained in database buffer cache 106, then database server 104 obtains the relevant data from primary database 108. Database server 104 stores relevant data obtained from primary database 108 in database buffer cache 106.

Database server 104 applies, to the relevant data in database buffer cache 106, changes indicated by the database commands. A "log writer" process of database server 104 also writes, to a current one of online redo log files 110, redo blocks that indicate the changes that database server 104 applied to the relevant data. At some point in time, a "database writer" process of database server 104 may store the modified data contained in database buffer cache 106 to primary database 108.

Each of online redo log files 110 is associated with a specified maximum size. As redo blocks are written to the current one of online redo log files 110, the current size of the current online redo log file increases. When the current size of the current online redo log file has reached the maximum specified size, a copy of the current online redo log file is stored in archived redo log files 112. The process of storing a copy of the current online redo log file in archived redo log files 112 is referred to as "archiving" the current online redo log file 110. After the current online redo log file has been archived, another one of online redo log files 110 may become the current online redo log file.

According to an embodiment of the present invention, log entries written to the current online redo log file are also transmitted, through network 114, to remote file server 116. For example, when database server 104 writes a redo block to the current online redo log file, database server 104 may also transmit the redo block through network 114 to remote file server 116. Thus, redo blocks written to the current online redo log file may be transmitted to remote file server 116 before the current online redo log file has reached the specified maximum size, and before the current online redo log file has been archived. Furthermore, after redo blocks have been sent to remote file server 116, subsequent redo blocks may be written to the current online redo log file, because the current online redo log file has not yet been archived.

Remote file server 116 receives redo blocks through network 114 and writes the redo blocks to a current one of online standby redo log files 118. Online standby redo log files 118 are associated with standby database 122. Standby recovery process 120, which is also associated with standby database 122, reads the redo blocks from the current online standby redo log file and applies, to the data contained in standby database 122, the changes indicated in those redo blocks. Standby recovery process 120 may read the redo blocks and apply the changes indicated therein soon after the redo blocks have been written to the current online standby redo log file. As a result, the data contained in standby database 122 is quickly synchronized with the data contained in primary database 108. At any given moment, the content of the data in standby database 122 accurately reflects the content of the data in primary database 108.

Primary and Standby Log Switching

As is discussed above, there may be multiple redo log files in each of online redo log files 110 and online standby redo log files 118, but only one current online redo log file in each. When the current one of online redo log files 110 is full, or in response to a user request to "switch" logs, database server 104 "switches into" another one of online redo log files 110. When this occurs, the current online redo log file is archived, as described above, and another one of online redo log files 110 becomes the current online redo log file.

According to one embodiment, when such a switch occurs, it occurs relative to the current online standby redo log file as well. In other words, when the current online redo log file is archived and another online redo log file becomes the new current online redo log file, the current online standby redo log file is also archived (in archived standby redo log files 124) and another online standby redo log file becomes the new current online standby redo log file.

In one embodiment, database server 104 comprises multiple threads of execution. Each such thread is assigned a different current online redo log file—threads do not concurrently write to the same current online redo log files. Each thread may be assigned a separate set of online redo log files from which to select a current online redo log file. Similarly, each thread is assigned a different current standby online redo log file, and may be assigned a separate set of online standby redo log files.

Log File Structure

In one embodiment, online redo log files 110 and online standby redo log files 118 are "pre-created" in that they are created once with a size specified by a database administrator, after which they can be used and re-used. In one embodiment, each of online redo log files 110 has the following on-disk structure: a 512 byte block that comprises the "log header," followed by one or more 512 byte "redo blocks," up to a specified maximum number of redo blocks (the specified size).

Log Header Structure

In one embodiment, the log header discussed above comprises multiple fields. In one embodiment, these fields include a size, a log sequence number, and a thread number. The size indicates how many redo blocks are contained in the redo log file. The log sequence number is a monotonically increasing positive integer. When an online redo log file becomes the current online redo log file, that online redo log file's log sequence number becomes one more than the log sequence number of the previous current online redo log file. According to one embodiment, the first current online redo log file assigned to each thread has a log sequence number of one. The thread number is a positive integer value that identifies the thread to which the online redo log file is assigned.

Known and Unknown Sizes

As discussed above, in one embodiment, a log header comprises a size. The current online log file's size is unknown. Therefore, in one embodiment, the current online log file's size, as indicated in the log header, is set to some value that is larger than any actual size that the current online log file could be. When the log is switched, and the current online log file is no longer the current online log file, then the size of the formerly current online log file is set to indicate the number of redo blocks contained in that online log file. This size is also indicated in the archived copy of that log file.

Redo Sequence Numbers

As discussed above, each log file may comprise one or more redo blocks. In one embodiment, each redo block comprises a "redo header" and "redo change vector data" that is generated by transactions. The redo header indicates a redo sequence number.

In one embodiment, when online log files are initially created (before any becomes the current online log file), the log sequence numbers for those online log files, and the redo sequence numbers of the redo blocks therein, are set to zero. In one embodiment, when a redo block is written to the current online redo log file, the redo sequence number for that redo block is assigned to be the same value as the log sequence number for that current online redo log file. Redo blocks are written contiguously and in order, so that if the last redo block was written at "block position 5" in the file, for example, then the next redo block is written at "block position 6" in the file.

A log switch occurs if an attempt to write a redo block would cause there to be more redo blocks in the current online redo log file than the maximum number of redo blocks specified for that file. Under such circumstances, the redo block that would have overflowed the current online redo log file is written instead at "block position 2" of the next current online redo log file, after log switching has occurred; "block position 1" is, according to one embodiment, reserved for redo log header information.

As discussed above, log switching also may occur before a current online redo log file is full, for example, in response to a command from a database administrator. As a result of online redo log file switching and reuse, the redo sequence numbers indicated in some of the redo headers in an online redo log file may come to vary from the log sequence number indicated in the log header of that online redo log file.

For example, an online log "OL_A" might be assigned an initial log sequence number "1." The maximum size specified for OL_A might be 10 redo blocks. If 8 redo blocks are written to OL_A before OL_A is "switched out of," then the first 8 redo blocks of OL_A indicate redo sequence numbers "1" (matching the log sequence number), but the last 2 redo blocks of OL_A indicate redo sequence numbers "0" (to which they were set when created).

The next time that OL_A becomes the current online redo log, OL_A might be assigned a log sequence number "3" (assuming that the previous current online redo log, e.g., "OL_B," was assigned a log sequence number "2.") If 7 redo blocks are written to OL_A before OL_A is "switched out of" again, then the first 7 redo blocks of OL_A indicate redo sequence numbers "3" (matching the log sequence number), but the next redo block would still indicate a redo sequence number "1" (from the last time that OL_A was the current online redo log file) and the next two redo blocks after that would still indicate redo sequence numbers "0."

Due to the manner in which standby log switching follows primary log switching, as described above, this variance in sequence numbers may occur in online standby redo log files also.

As a result of the way that redo sequence numbers are determined and the contiguous manner in which redo blocks are written, redo sequence numbers of redo blocks occurring later in a redo log file are no larger than redo sequence numbers of redo blocks occurring earlier in that redo log file.

As is discussed above, when a current online redo log file is "switched out of," a copy of that file is archived. In one embodiment, when a redo log file is archived, redo blocks therein that have redo sequence numbers that differ from the redo log file's log sequence number are not written to the archived copy. Consequently, archived redo log files have the exact number of redo blocks as the size indicated in the log header.

Control Files and Redo Log File Availability

In one embodiment, both primary database 108 and standby database 122 are associated with separate control files. In one embodiment, each such control file contains a separate description entry for each online redo log file. More specifically, the "primary control file" contains a description entry for each of online redo log files 110, and the "standby control file" contains a description entry for each of online standby redo log files 118.

According to one embodiment, each description entry in a control file comprises at least the following fields: a thread number corresponding to a thread to which the redo log file is assigned, the log sequence number indicated in the redo log file's log header, the size of the redo log file (which is unknown if the redo log file is the current redo log file), and a directory path that indicates the physical location of the redo log file on disk.

In one embodiment, after the current online redo log file and the current online standby redo log file have been archived, the log sequence numbers in the corresponding description entries in the respective control files are set to zero, which indicates that those redo log files are available for re-use as current redo log files.

Applying Redo Blocks in Real Time

Figure 2:
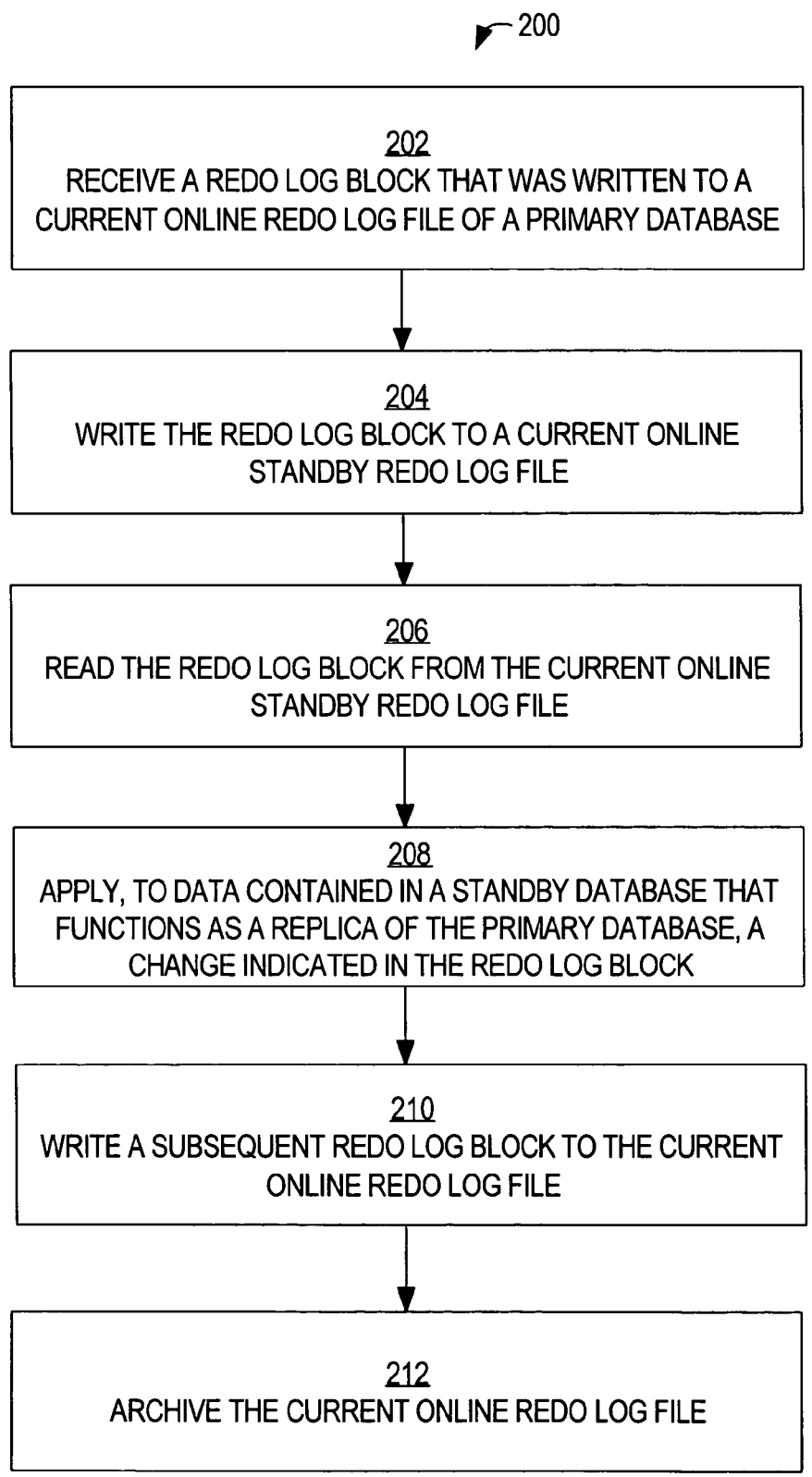
FIG. 2 is a flow diagram that illustrates a technique for applying, to a standby database, in real time, a change indicated in a redo block, according to an embodiment of the present invention.

FIG. 2 is a flow diagram that illustrates a technique 200 for applying, to a standby database, in real time, a change indicated in a redo block, according to an embodiment of the present invention. In block 202, a redo block that was written to a current online redo log file of a primary database is received. For example, remote file server 116 may receive, through network 114, a particular redo block that database server 104 wrote to the current online redo log file in online redo log files 110.

In block 204, the redo block is written to a current online standby redo log file. Continuing the example, in response to receiving the particular redo block, remote file server 116 may write the particular redo block to the current online standby redo log file in online standby redo log files 118.

In block 206, the redo block is read from the current online standby redo log file. Continuing the example, standby recovery process 120 may monitor the current online standby redo log file. Upon determining that the particular redo block has been written to the current online standby redo log file, standby recovery process 120 may read the particular redo entry from the current online standby redo log file.

In block 208, a change indicated in the redo block is applied to data contained in a standby database that functions as a replica of the primary database. Continuing the example, standby recovery process 120 may apply, to data contained in standby database 122, a change indicated by the particular redo block.

In block 210, a subsequent redo block is written to the current online redo log file. Continuing the example, after standby recovery process 120 has applied the change as described above, database server 104 may write a subsequent redo block to the current online redo log file in online redo log files 110. This subsequent redo block may also be applied to the data contained in standby database 122 in the manner described above.

In block 212, the current online redo log file is archived. The current online redo log file may be archived in response to the maximum size being reached, or in response to a command from a database administrator. Continuing the example, database server 104 may determine that the size of the current online redo log file has reached the specified maximum size. In response to this determination, database server 104 may store a copy of the current online redo log file in archived redo log files 112. Thus, in the above example, the particular redo block is applied to the data contained in standby database 122 before the current online redo log file is archived.

Polling the Current Standby Redo Log File

It is conceivable that standby recovery process 120 might read redo blocks from the current online standby redo log file faster than redo blocks are written to the current online standby redo log file. Under such circumstances, standby recovery process 120 may detect a "logical end of file" condition when reading the current online standby redo log file.

Therefore, in one embodiment, standby recovery process 120 determines whether the logical end of the current online standby redo log file has been reached. For example, standby recovery process 120 may make this determination using the technique described below. If the logical end of the current online standby redo log file has been reached, then standby recovery process 120 waits for a specified period of time. This prevents overuse of the central processing unit (CPU). After the specified period of time has passed, standby recovery process 120 proceeds to read additional redo blocks, if any, from the current online standby redo log file and/or an archived copy of a standby redo log file according to the techniques described below.

Alternatively, if the logical end of the current online standby redo log file has not been reached, then standby recovery process 120 reads a redo block from the current online standby redo log file. This continues until the logical end of file is detected as described below.

Detecting Logical End of File

An example of one technique for detecting a logical end of file (EOF) condition follows. In one embodiment, when standby recovery process 120 starts reading and recovering redo from the current online standby redo log, standby recovery process 120 keeps track of the current online standby redo log file's log sequence number (the "recovery sequence number") in memory. In other words, when standby recovery process 120 opens the current online standby redo log file for reading, standby recovery process 120 reads the recovery sequence number from that redo log file and stores the recovery sequence number in memory. Then standby recovery process 120 reads redo blocks from the current online standby redo log file.

As long as the redo sequence number indicated in a redo block matches the recovery sequence number, standby recovery process 120 can safely apply, to data stored in standby database 122, changes indicated in that redo block. Alternatively, if standby recovery process 120 detects that a redo block's sequence number is less than the recovery sequence number, then standby recover process 120 determines that the logical end of the online redo log file has been reached.

Detecting Reuse

As described above, in one embodiment, when log switching occurs relative to online redo log files 110, log switching also occurs relative to online standby redo log files 118. When log switching occurs relative to online standby redo log files 118, a copy of the current online standby redo log file is stored in archived standby redo log files 124. The archived copy of that standby redo log file replicates the archived copy of the corresponding online redo log file that was formerly current.

Also as described above with reference to FIG. 3, in one embodiment, when the logical end of the current online standby redo log file has been reached, standby recovery process 120 waits or "sleeps" for a specified period of time. During this time, events may occur, and one of several possible cases may exist when standby recovery process 120 stops waiting. Some of these cases are enumerated below, using "STANDBY_OL_A" as an example of the online standby redo log file that was current at the time that standby recover process 120 started to wait.

Case 1: remote file server 116 might have written more redo blocks to STANDBY_OL_A, and STANDBY_OL_A might remain the current online standby redo log file.

Case 2: STANDBY_OL_A might have been "switched out of" but not yet archived. In this case, the size in STANDBY_OL_A's description entry in the standby control file will have been updated to indicate the actual size of STANDBY_OL_A.

Case 3: STANDBY_OL_A might have been "switched out of" and archived. In this case, both the log sequence number in STANDBY_OL_A's log header and the log sequence number in STANDBY_OL_A's description entry in the standby control file will have been set to zero. Additionally, as in case 2 above, the size in STANDBY_OL_A's description entry in the standby control file will have been updated to indicate the actual size of STANDBY_OL_A.

Case 4: STANDBY_OL_A might have been "switched out of," archived, and reused ("switched back into"), but the redo block at the position that caused logical EOF to be detected (the "logical EOF position") might not have been overwritten. In this case, a new and larger log sequence number will have been assigned to STANDBY_OL_A.

Case 5: STANDBY_OL_A might have been "switched out of," archived, reused ("switched back into"), and the redo block at the logical EOF position might have been overwritten. In this case, the redo sequence number of the redo block at the logical EOF position will reflect the new and larger log sequence number that will have been assigned to STANDBY_OL_A upon reuse.

In cases where additional redo blocks were written at and/or after the logical EOF position but all of those additional redo blocks' redo sequence numbers indicate the same log sequence number as those before the logical EOF position (possible in cases 1 through 3 above), standby recover process 120 may apply, to the data contained in standby database 122, the changes indicated in the additional redo blocks.

In case 5, the difference in the additional redo blocks' redo sequence numbers signals to standby recovery process 120 that the current online standby redo log file has been reused. In response, standby recovery process 120 reads archived log description entries that correspond to the log sequence number that was in use at the time that standby recovery process 120 started waiting. From these entries, standby recovery process 120 determines the size of the archived redo log file that has that log sequence number. Standby recovery process 120 applies, to the data contained in standby database 122, the unapplied changes indicated in the archived redo log file (those that are indicated in redo blocks occurring at or after the logical EOF position).

In cases where a log switch has occurred but no additional redo blocks have been written at or after the logical EOF position (possible in cases 2, 3, and 4), standby recovery process 120 is at risk of waiting indefinitely unless standby recovery process 120 detects a hint that the log switch has occurred. In one embodiment, updating an in-memory SGA cell that keeps track of the current log sequence number provides such a hint. If standby recovery process 120 determines that (a) the current log sequence number is greater than the recovery sequence number and (b) the size of the online redo log that was current when standby recovery process 120 began waiting is unknown, then standby recovery process 120 determines that a log switch has occurred. In response to determining that a log switch has occurred, standby recovery process 120 reads archived log description entries that correspond to the log sequence number that was in use at the time that standby recovery process 120 started waiting. From these entries, standby recovery process 120 determines the size of the archived redo log file that has that log sequence number. Standby recovery process 120 applies, to the data contained in standby database 122, the unapplied changes indicated in the archived redo log file (those that are indicated in redo blocks occurring at or after the logical EOF position).

In one embodiment, instead of providing a hint by updating an in-memory SGA cell as described above, a "dummy" redo block is written to the current online standby redo log file when standby recovery process 120 begins waiting. The dummy redo block's redo sequence number matches the current online standby redo log file's log sequence number, but the dummy redo block also contains a special flag or code that indicates to standby recovery process 120 that the dummy redo block is the last redo block corresponding to the log sequence number. Based on the dummy redo block, standby recovery process 120 can determine whether a log switch occurred while standby recovery process 120 was waiting.

In one embodiment, when additional redo blocks are written to the current online standby redo log file but no log switch occurs while standby recovery process 120 is waiting, another in-memory hint is provided to signal to standby recovery process 120 that additional redo blocks have been written but no log switch has occurred. In one embodiment, to reduce I/O calls, standby recovery process 120 does not attempt to read additional redo blocks unless it determines from this hint that additional redo blocks have been written to the current online standby redo log file.

Redo Block Read/Write Concurrency Control

Remote file server 116 writes redo blocks to the current online standby redo log file. Standby recovery process 120 reads redo blocks from the current online standby redo log file. In one embodiment, redo blocks are read and written in batches, which may be relative large. The size of a write batch may differ from the size of a read batch.

Nevertheless, in one embodiment, no latching scheme needs to be implemented between the reading and writing processes. Many operating systems guarantee read/write consistency of 512 byte blocks. Thus, most operating systems guarantee that a reading process will not read a fractured 512 byte redo block (that contains some data from a previous version and some data from a new version). Reading processes will see either a complete old version of the redo block or a complete new version of the redo block. As a result, remote file server 116 and standby recovery process 120 do not need to implement latching or semaphore schemes to coordinate reading and writing.

Avoiding Inconsistencies Due to I/O Failures

As is discussed above, redo blocks are written to the current online redo log file and the current online standby redo log file in a parallel manner. According to one embodiment, when database server 104 issues an I/O call to the current online redo log file, database server 104 does not wait for the I/O call to be completed before the corresponding I/O call is issued to the current online standby redo log file; the corresponding I/O call is issued to the current online standby redo log file as soon as the I/O call to the current online redo log file is queued.

Due to an I/O failure somewhere within the primary system, changes might be applied and committed in standby database 122 but not in primary database 108. If this was not remedied, the data in primary database 108 might become inconsistent with the data in standby database 122.

To avoid this inconsistency, in one embodiment, an in-memory "recovery boundary" is maintained. The recovery boundary indicates the thread number, log sequence number, and redo block position number. The recovery boundary tells standby recovery process 120 whether changes indicated in redo blocks can be applied to data in standby database 122.

When changes indicated in redo blocks are committed in primary database 108, the recovery boundary is increased. The redo block position number is conveyed to remote file server 116 and standby recovery process 120 along with the redo blocks sent to file server 116.

In one embodiment, there are multiple standby instances. In this embodiment, each instance may receive redo blocks from one or more threads of database server 104. The recovery boundary is maintained across all of the instances. When any instance realizes that the recovery boundary has been increased, that instance notifies all of the other instances of the increase.

Multiple Thread Considerations

When there are multiple threads involved, in one embodiment, standby recovery process 120 merges redo at a certain "system change number" from all threads before standby recovery process 120 applies redo at the next such system change number. In the process of merging redo, standby recovery process 120 might read redo from multiple online standby redo logs—possibly one online standby redo log for each thread.

Hardware Overview

Figure 3:
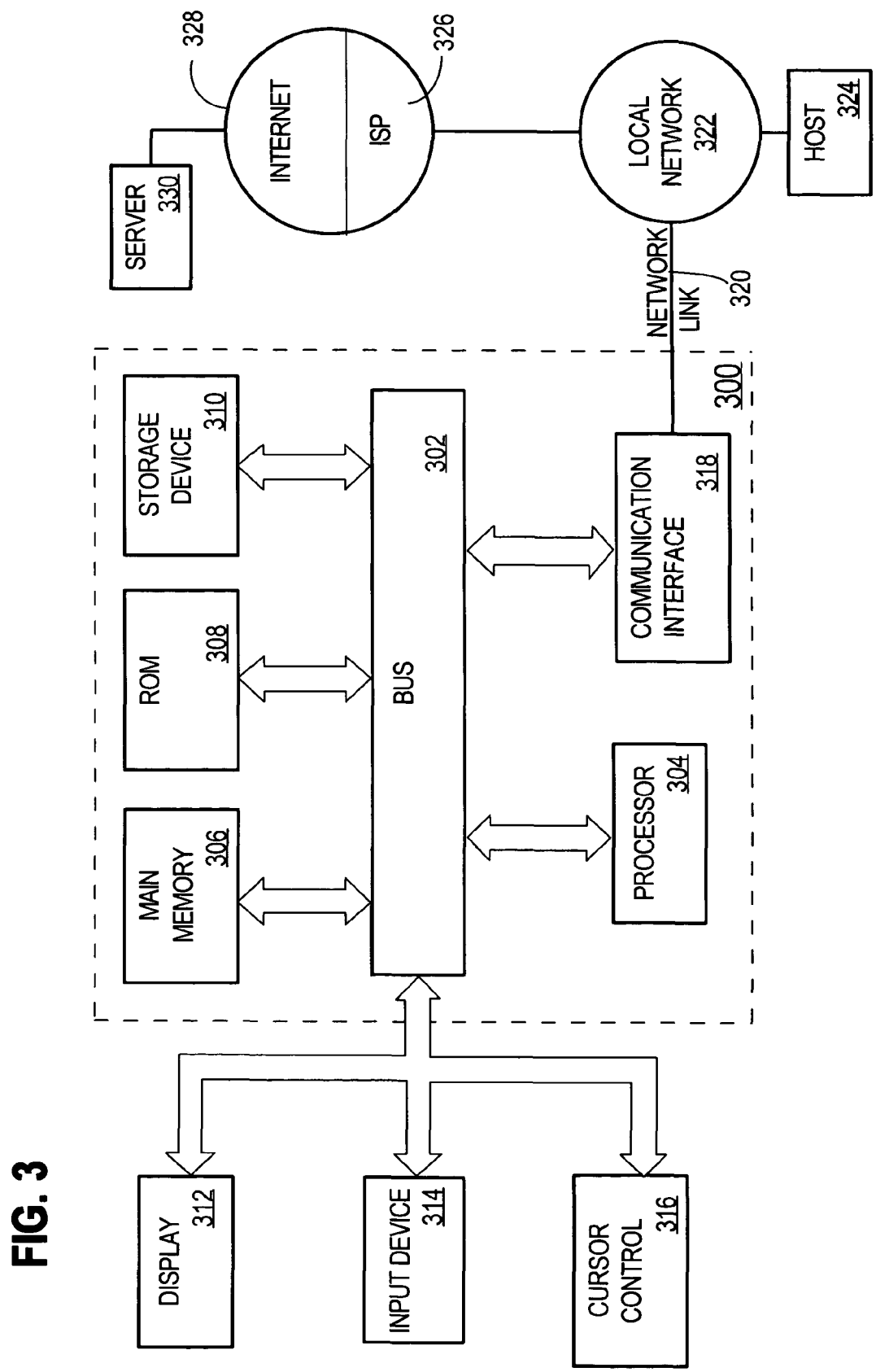
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method of replicating data, the method comprising steps of:

replicating, to a current standby redo log file in a standby database, writes that occur to a primary redo log file in a primary database as the writes occur;

while said replicating is ongoing, continuously reading one or more standby redo blocks from the current standby redo log file and continuously applying, to data in the standby database, while said replicating is ongoing, changes specified in the one or more standby redo blocks;

in response to a second primary redo log file in the primary database becoming a current primary redo log file after a first primary redo log file had been the current primary redo log file, setting a second primary log sequence number, which is indicated in the second primary redo log file, to be a value that is different than a first primary log sequence number that is indicated in the first primary redo log file;

wherein, at a time that the second primary redo log file becomes the current primary redo log file, the second primary redo log file already contains at least one redo block that indicates a recovery sequence number that is different from said value;

writing, to the second primary redo log file, one or more redo blocks that indicate recovery sequence numbers that are the same as said value;

determining whether a recovery sequence number indicated in a first redo block in the current standby redo log file is the same as a log sequence number that is indicated in the current standby redo log file; and in response to determining that the first redo block's recovery sequence number is not the same as the current standby redo log file's log sequence number, determining that a logical end of the current standby redo log file has been reached, and refraining from applying, to data contained in the standby database, a change that is specified in the first redo block;

wherein the steps are performed by one or more computing devices.

2. The method of claim 1, further comprising:

polling the current standby redo log file to determine if an additional redo block was written to the current standby redo log file after a change indicated by a redo block was applied to the data contained in the standby database; and in response to a determination that the additional redo block was written to the current standby online redo log file, applying, to the data contained in the standby database, a change indicated by the additional redo block.

3. The method of claim 1, further comprising:

after applying a change indicated by a redo block, determining whether all changes indicated by redo blocks contained in an archived copy of a standby redo log file have been applied to the data contained in the standby database; and in response to a determination that all changes indicated by redo blocks contained in the archived copy have been applied to the data contained in the standby database, applying, to the data contained in the standby database, a change indicated by a redo block that is contained in a standby redo log file that differs from the archived copy.

4. The method of claim 1, further comprising:

in response to determining that a logical end of the current standby redo log file has been reached, waiting for a specified period of time before reading any further redo blocks from the current standby redo log file.

5. A non-volatile or volatile computer-readable storage medium carrying one or more sequences of instructions which, when executed by one or more processors, cause the one or more processors to perform steps comprising:

replicating, to a current standby redo log file in a standby database, writes that occur to a primary redo log file in a primary database as the writes occur;

while said replicating is ongoing, continuously reading one or more standby redo blocks from the current standby redo log file and continuously applying, to data in the standby database, while said replicating is ongoing, changes specified in the one or more standby redo blocks;

in response to a second primary redo log file in the primary database becoming a current primary redo log file after a first primary redo log file had been the current primary redo log file, setting a second primary log sequence number, which is indicated in the second primary redo log file, to be a value that is different than a first primary log sequence number that is indicated in the first primary redo log file;

wherein, at a time that the second primary redo log file becomes the current primary redo log file, the second primary redo log file already contains at least one redo block that indicates a recovery sequence number that is different from said value;

writing, to the second primary redo log file, one or more redo blocks that indicate recovery sequence numbers that are the same as said value;

determining whether a recovery sequence number indicated in a first redo block in the current standby redo log file is the same as a log sequence number that is indicated in the current standby redo log file; and in response to determining that the first redo block's recovery sequence number is not the same as the current standby redo log file's log sequence number, determining that a logical end of the current standby redo log file has been reached, and refraining from applying, to data contained in the standby database, a change that is specified in the first redo block.

6. The computer-readable medium of claim 5, wherein the steps further comprise:

polling the current standby redo log file to determine if an additional redo block was written to the current standby redo log file after a change indicated by a redo block was applied to the data contained in the standby database; and in response to a determination that the additional redo block was written to the current standby online redo log file, applying, to the data contained in the standby database, a change indicated by the additional redo block.

7. The computer-readable medium of claim 5, wherein the steps further comprise:

after applying a change indicated by a redo block, determining whether all changes indicated by redo blocks contained in an archived copy of a standby redo log file have been applied to the data contained in the standby database; and in response to a determination that all changes indicated by redo blocks contained in the archived copy have been applied to the data contained in the standby database, applying, to the data contained in the standby database, a change indicated by a redo block that is contained in a standby redo log file that differs from the archived copy.

8. The computer-readable medium of claim 5, wherein the steps further comprise:

in response to determining that a logical end of the current standby redo log file has been reached, waiting for a specified period of time before reading any further redo blocks from the current standby redo log file.

\* \* \* \* \*

UNITED STATES PATENT AND TRADEMARK OFFICE
CERTIFICATE OF CORRECTION

| | | |
|---|---|---|
| PATENT NO. | : 7,996,363 B2 | Page 1 of 1 |
| APPLICATION NO. | : 10/927927 | |
| DATED | : August 9, 2011 | |
| INVENTOR(S) | : Girkar et al. | |

It is certified that error appears in the above-identified patent and that said Letters Patent is hereby corrected as shown below:

In column 3, line 63, delete "toga" and insert -- to a --, therefor.

Signed and Sealed this
Fifteenth Day of November, 2011

David J. Kappos
*Director of the United States Patent and Trademark Office*